(No Model.)

J. G. HERMES.
APPARATUS FOR HEATING AND FILTERING WATER.

No. 532,374.  Patented Jan. 8, 1895.

WITNESSES:
William M. Miller
Chas. E. Poensgen

INVENTOR:
John George Hermes
BY
Hauff & Hauff
ATTORNEYS.

UNITED STATES PATENT OFFICE.

JOHN GEORGE HERMES, OF MOUNT VERNON, NEW YORK.

APPARATUS FOR HEATING AND FILTERING WATER.

SPECIFICATION forming part of Letters Patent No. 532,374, dated January 8, 1895.

Application filed October 4, 1894. Serial No. 524,918. (No model.)

*To all whom it may concern:*

Be it known that I, JOHN GEORGE HERMES, a citizen of the United States, residing at Mount Vernon, in the county of Westchester and State of New York, have invented new and useful Improvements in Apparatus for Heating and Filtering Water, of which the following is a specification.

The object of this invention is to provide an apparatus by which water can be effectively heated and filtered, the invention residing in the novel features of construction set forth in the following specification and claims and illustrated in the annexed drawings, in which—

Figure 1:
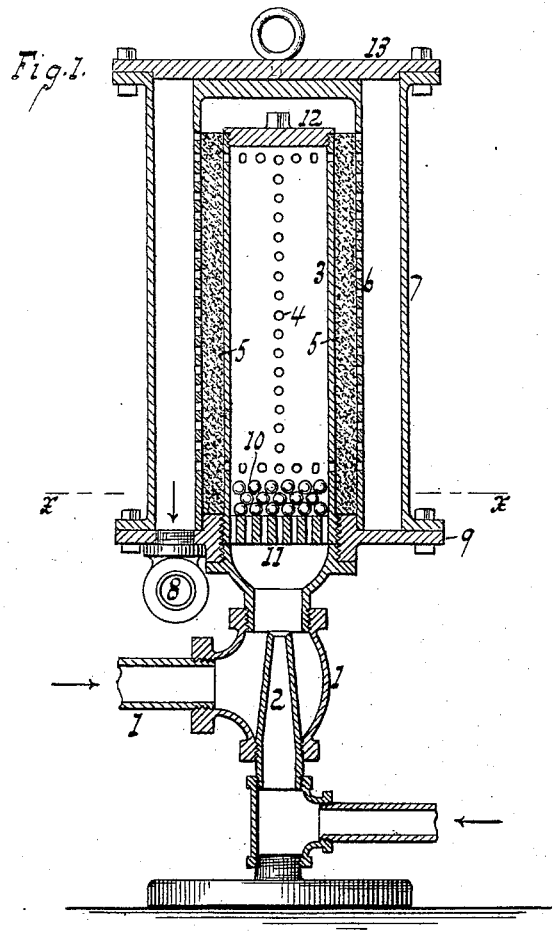
Figure 2:
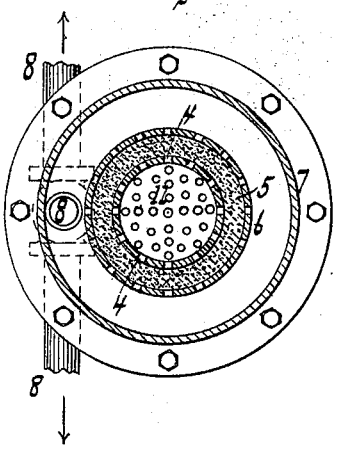

Figure 1 is a sectional elevation of the apparatus. Fig. 2 is a transverse section along *x x* Fig. 1.

The water inlet or supply pipe 1 is shown with a heat supply pipe 2 for a source of heat such as steam or hot air. By housing the heat supply 2 in the inlet 1 said heat supply is in position for effective heating. The water and heat pass into what may be called the heating chamber 3 where the water becomes thoroughly heated, said heating chamber having perforations 4 for the escape of the heated water. The heating chamber is surrounded or inclosed by a filter comprising a straining or filtering substance 5 such as cloth or the like surrounded by a perforated shell 6. Passing through this filter 5, 6 the heated water enters the receiving chamber 7 whence it can be drawn off through one or more outlets or discharges 8 to be utilized as required for bathing, washing or otherwise.

If desired the inlet 1 can be cast integral with the flange 9 and with the side wall of the receiving chamber 7 so that the device will be strong and durable. The flange 9 supports chamber 7. The inlet 1 or its upper portion being suitably tapped and the chamber 3 correspondingly threaded the latter can be readily screwed in place on the inlet.

The heating chamber being provided with a suitable filling material 10 such as pebbles, glass marbles or the like, the steam entering from the heat supply 2 will not only thoroughly mingle with or heat the water, but said filling material will also obstruct the onward rush of the steam so as to prevent noise or hissing. The perforated bottom 11 of the heating chamber retains the filling or obstructing material 10 against falling out of the heating chamber.

When the heating chamber is screwed in place the filtering substance 5 is readily placed about or slipped over the heating chamber after which the shell 6 is readily slipped over the substance 5. This filtering substance 5 is readily formed by a tubular piece of goods somewhat in the nature of a tubular lamp wick.

The tops of the chambers 3 and 7 are readily closed by covers, plugs or screws 12 and 13.

What I claim as new, and desire to secure by Letters Patent, is—

1. In a water heater and filter, the combination with a perforated heating chamber open at its bottom and closed at its top and communicating at its bottom with a water inlet and heat supply pipe, a perforated shell arranged concentrically about the heating chamber, a filtering material arranged between said shell and heating chamber, a casing surrounding said filter and heating chamber and forming a hot water receptacle, and a discharge pipe arranged in the bottom thereof, substantially as described.

2. In a water heater and filter, the combination of a heating chamber open at its bottom and provided at its top with a removable cover, said chamber having perforated side walls, a water inlet and heat supply pipe communicating with the open lower end of the heating chamber, a perforated shell arranged concentrically about the heating chamber, a filtering material disposed between said shell and heating chamber, a casing surrounding said shell and heating chamber, a removable cover for said casing and a discharge pipe arranged in the bottom of said casing, substantially as described.

3. In a water heater and filter, the combination of a heating chamber provided with a foraminous bottom and a removable cover and having perforated side walls, a bed of granular material disposed upon the perforated bottom of the heating chamber, a water inlet and heat supply pipe communicating with the lower end of the heating chamber, a perforated shell arranged concentrically about the heating chamber, filtering material disposed between said shell and heating chamber, a casing surrounding said shell and chamber, a removable cover therefor, and a discharge pipe arranged in the bottom of said casing, substantially as described.

In testimony whereof I have hereunto set my hand in the presence of two subscribing witnesses.

J. GEORGE HERMES.

Witnesses:
WM. C. HAUFF,
E. F. KASTENHUBER.